(12) United States Patent
Raber (10) Patent No.: US 11,132,443 B1
(45) Date of Patent: Sep. 28, 2021

(54) EXCEPTION HANDLERS IN A SANDBOX ENVIRONMENT FOR MALWARE DETECTION

(71) Applicant: Malwarebytes Inc., Santa Clara, CA (US)

(72) Inventor: Jason Neal Raber, Bellbrook, OH (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 17/163,024

(22) Filed: Jan. 29, 2021

(51) Int. Cl.
  *G06F 21/00* (2013.01)
  *G06F 21/56* (2013.01)
  *G06F 21/53* (2013.01)

(52) U.S. Cl.
  CPC ............ *G06F 21/566* (2013.01); *G06F 21/53* (2013.01); *G06F 2221/033* (2013.01)

(58) Field of Classification Search
  CPC ... G06F 21/566; G06F 21/53; G06F 2221/033
  See application file for complete search history.

(56) References Cited

U.S. PATENT DOCUMENTS 10,489,592 B1 * 11/2019 Naamneh ............ G06F 12/1441

OTHER PUBLICATIONS

Github, "CTP/OSCE Prep—'GMON' SEH Based Overflow in Vulnserver," May 25, 2019, 28 pages, [Online] [Retrieved on Feb. 11, 2021] Retrieved from the Internet <URL: https://h0mbre.github.io/SEH_Based_Exploit/#>.

* cited by examiner

*Primary Examiner* — Tri M Tran
(74) *Attorney, Agent, or Firm* — Fenwick & West LLP (57) ABSTRACT

An anti-malware application can emulate a suspicious program in a sandbox environment and retrieve any exception handlers the suspicious program attempts to register with the operation system. When the suspicious program triggers an exception, the anti-malware application can save a current context of the suspicious program being emulated. To emulate the handling of the exception, the anti-malware application can validate an exception handler chain including one or more exception handlers added by the suspicious program. The anti-malware application can then select and emulate an exception handler based on the saved context of the suspicious program at the time the exception was triggered. If the first exception handler is successful at resolving the exception, the anti-malware application can then save an updated post-exception context and continue emulation of the suspicious program based on the result of the first exception handler.

17 Claims, 5 Drawing Sheets

EXCEPTION HANDLERS IN A SANDBOX ENVIRONMENT FOR MALWARE DETECTION

FIELD OF ART

The present disclosure generally relates to malware detection and, more specifically, to monitoring a suspicious program as the suspicious program throws exceptions and otherwise diverts control flow.

BACKGROUND

A sandbox is an application for emulating execution of a suspicious computer program in a secure and isolated computing environment. Sandboxes may be utilized as a component of a malware detection application to monitor behavior of a suspicious program and determine if it is malicious prior to letting the program execute in the native environment (where it may be able to access the rest of the system). To trick anti-malware applications into allowing a suspicious program to run, malware developers incorporate obfuscation techniques that try to obscure the malicious nature of a malware program from detection by anti-malware applications (including from applications using sandboxing techniques). Malware that can avoid detection and removal by anti-malware applications and run in the native (non-sandbox) environment and is then able to execute malicious code (relatively) unimpeded by the anti-malware application.

In some cases, malware may intentionally trigger exceptions to interrupt the normal control of the program, causing a sandbox emulating execution of the malware to terminate. If the malicious code within the malware is not executed until after the intentional exceptions are thrown, then the malware may be able to hide these malicious actions from detection by the anti-malware application.

SUMMARY

An anti-malware application can emulate a suspicious program in a sandbox environment and log any exception handlers the suspicious program attempts to register with the operating system. When the suspicious program triggers an exception, the anti-malware application can save a current context of the suspicious program being emulated. To emulate the handling of the exception, the anti-malware application can validate an exception handler chain including one or more exception handlers added by the suspicious program.

The anti-malware application can then select and emulate an exception handler (for example, one added by the suspicious program) based on the saved context of the suspicious program at the time the exception was triggered. If the first exception handler is successful at resolving the exception (for example, if the suspicious program is able to continue execution after the exception handler), the anti-malware application can then save an updated post-exception context and continue emulation of the suspicious program based on the result of the first exception handler.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
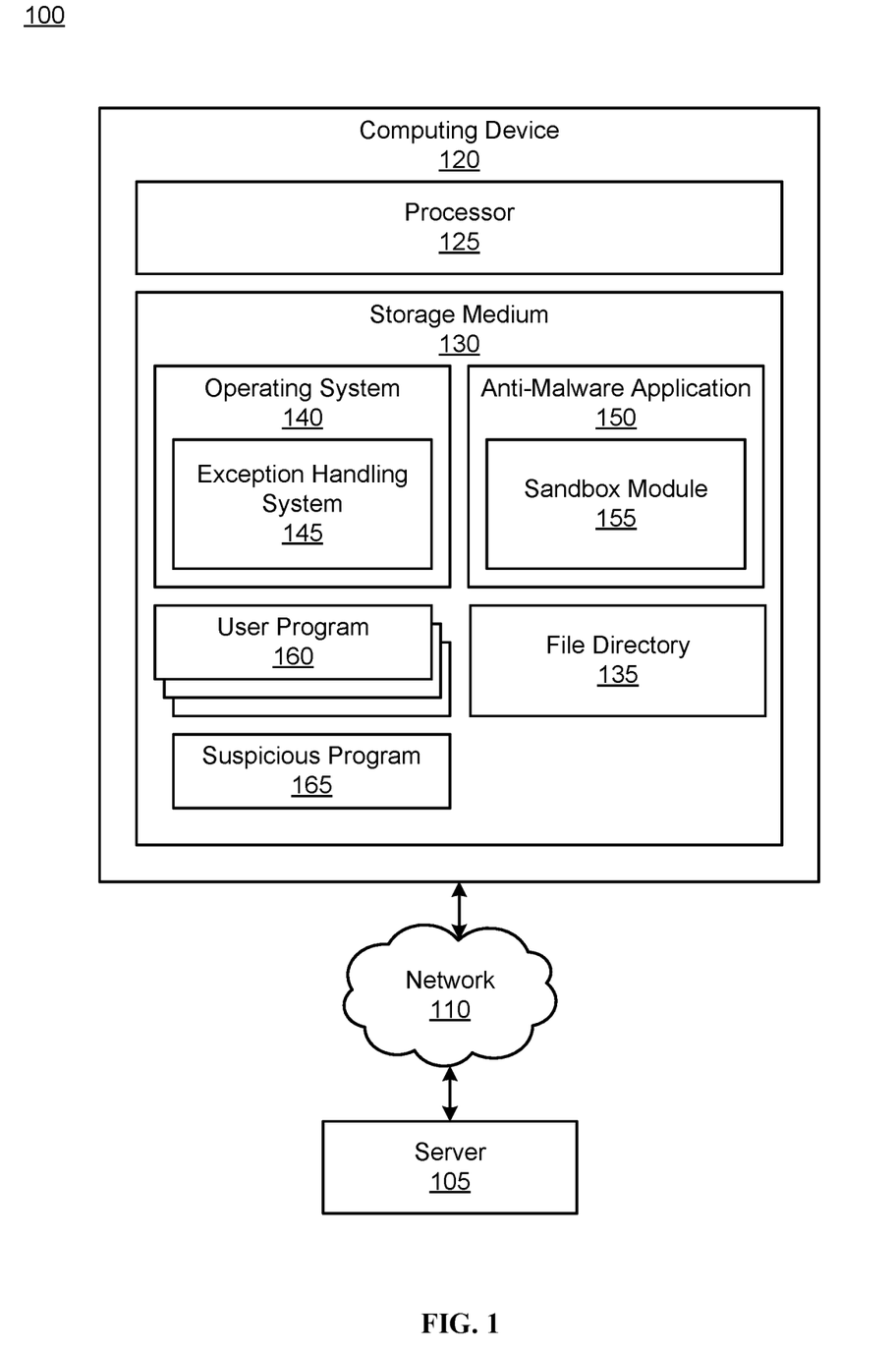
FIG. 1 is a system diagram illustrating an example computing device including an anti-malware application, according to an embodiment.

FIG. 1 is a system diagram illustrating an example computing device including an anti-malware application, according to an embodiment. The environment 100 of FIG. 1 includes a server 105, a network 110, and a computing device 120 (also referred to as a computing device 120). For simplicity and clarity, only one server 105 and one client computing device 120 is shown in the environment 100. However, other embodiments may include different numbers of servers 105 and computing device 120. The system environment 100 may also include different or additional entities.

The network 110 represents communication pathways between the server 105 and computing device 120, which may be communicatively connected. For example, the network 110 can be the Internet. The network 110 may additionally utilize dedicated or private communications links that are not necessarily part of the Internet such as local area networks (LAN). In some embodiments, the network 110 uses standard communications technologies and/or protocols such as Ethernet, WiFi, or cellular data technologies.

A computing device 120 may be a desktop computer, a laptop computer, a smart phone, a tablet computing device, an Internet of Things (IoT) device, or any other device having computing and data communication capabilities. A computing device 120 is capable of processing data and may be capable of transmitting and receiving data via the network 110. In the embodiment of FIG. 1, the computing device 120 includes a processor 125 for manipulating and processing data and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, compact discs and the like. In addition to storing program instructions, the storage medium 130 may store various data associated with operation of the computing device 120 or for use by applications executing on the computing device 120.

In one embodiment, the storage medium 130 comprises a non-transitory computer-readable storage medium that stores a file directory 135 and various executable programs including an operating system 140, anti-malware application 150, and user programs 160 that are each embodied as computer-executable instructions stored to the non-transitory computer-readable storage medium. The instructions, when executed by the processor 125, cause the computing device 120 to perform the functions attributed to the programs described herein.

In some embodiments, the operating system (OS) 140 is a specialized program that manages computer hardware resources of the computing device 120 and provides common services to the user programs 160. For example, a computer's operating system 140 may manage the processor 125, storage medium 130, or other components such as a graphics adapter, an audio adapter, network connections, disc drives, and USB slots (not illustrated). A cell phone's operating system 140 may manage the processor 125, storage medium 130, display screen, keypad, dialer, wireless network connections and the like. Because many programs and executing processes compete for the limited resources provided by the processor 125, the operating system 140 may manage the processor bandwidth and timing to each requesting process. Examples of operating systems 134 include WINDOWS, MAC OS, IOS, LINUX, UBUNTU, UNIX, and ANDROID.

An operating system 140 may include an exception handling system 145 that allows the operating system 140 to handle exceptions arising during the operation the computing device 120. In most cases exceptions are unplanned and occur due to unintentional faults (such as bugs, oversights, corrupted files, lack of system resources, and unexpected interactions between programs). An exception can be thrown when code is executed that cannot be resolved normally, such as requesting a division by zero, attempting to access a non-existent memory location, or using a reference that points to a null value, or other operations that prevents execution of the following instructions from proceeding. When an exception occurs during the execution of the program, an interrupt function is invoked that causes the exception handling system 145 to assume control to handle the exception in the appropriate way. For example, the exception handling system 145 can force the program which caused the exception to close or (in extreme cases) trigger a system restart or other OS-level action. An exception handler is a function or other set of instructions which can be executed to resolve one or more types of exceptions. In some implementations, the exception handling system 145 allows programs 160 to implement custom exception handlers, which are triggered whenever corresponding exceptions are thrown in those user programs 160. In the absence of a custom exception handler resolving the exception, default operating system exception handler may be invoked by the exception handling system 145. An example exception handling system 145 will be discussed further in relation to FIG. 2.

The set of user programs 160 may include applications for performing a particular set of functions, tasks, or activities for the benefit of the user. For example, the set of user programs 160 installed on a computing device 120 can include word processors, spreadsheet applications, video games, and web browsers. A user of the computing device 120 may manually install user programs 160, or user programs can be preinstalled, automatically installed, or otherwise added to the computing device in some way. User programs 160 (depending on the stated purpose/functionality) can have access to sensitive user data, files, or other valuable information stored on the computing device 120.

In some cases, a user program 160 contains hidden malware that will be installed alongside the user program 160 or when it executes. A suspicious program 165, as used herein, refers to a user program 160, operating system file, or other file that potentially contains malware. Malware contained within a suspicious program 165 may infect the computing device 120 when the suspicious program 165 is installed, opened, or executed. Often suspicious programs are newly downloaded or installed, but existing user programs 160 or files may be considered suspicious programs by the anti-malware application 150 under some circumstances. In some implementations, an anti-malware application 150 considers newly installed user programs 160 (or programs exhibiting suspicious behavior) to be suspicious programs 165. The anti-malware application 150 may analyze suspicious programs 165 prior to their installation, opening, and/or execution on the computing device 120 to determine if the suspicious program 165 contains malware and should be removed or if the suspicious program is cleared to be installed.

The file directory 135 stores files. Files may include system files associated with operation of the operating system 140, the user programs 160, or the anti-malware application 150. The files may further include user files that may be created or modified by users. Examples of user files may include image files, video files, word processor documents, spreadsheet documents, and drawing files. User files are generally highly valuable to the users because they may be personal in nature and may be difficult or impossible to recover or replace if compromised. As a result, certain types of malware such as ransomware may target user files.

An anti-malware application 150 attempts to detect, stop, and remove malware before it can negatively affect the computing device 120, according to some embodiments. The anti-malware application 150 may prevent new malware from being installed on a computing device 120 or remove or disable existing malware that is already present on the computing device 120 once it is detected by the anti-malware application 150. The anti-malware application 150 may determine if a suspicious program 165 contains malware based on behaviors indicative of malware, based on static analysis of a file associated with the suspicious program 165, based on emulation of a program using the sandbox module 155 described in further detail below, or based on a combination of factors (including some or all of the listed factors). The anti-malware application 150 may use malware definitions that specify characteristics or behaviors of malware that the anti-malware application 150 seeks to detect in suspicious programs 165. In some implementations, the anti-malware application 150 extracts and sends data on a suspicious program's files to the server 105 for classification instead of performing detection locally. The server 105 may receive the data, perform analysis and classification and send data and instructions back to the anti-malware application 150 to enable the computing device 120 to identify and stop malicious activities.

The anti-malware application 150 includes a sandbox module 155 to sandbox suspicious programs 165 (for example, before allowing the suspicious program 165 to install or execute). The sandbox module 155 is an application for emulating and monitoring behavior of a suspicious program 165 in an isolated and secure environment (the "sandbox environment"). A suspicious program 165 being analyzed in the sandbox environment is unable to affect the file directory 135 or the computing system 120 outside of the sandbox environment. In some implementations, the sandbox module 155 operates by hooking certain functions (such as API functions) of the suspicious program 165 that could potentially contain malware and executing the instructions of the selected functions in a sandbox environment (a virtual environment isolated from the native environment of the operating system 140).

When sandboxing a suspicious program 165, the sandbox module 155 can control and monitor the resources the suspicious program 165 has access to. For example, the sandbox module 155 can control the memory (and other storage space) assigned to/used by the suspicious program 165 and follow the execution of each instruction executed by the suspicious program 165 as it is executed. In some implementations, the sandbox module 155 "wraps" the suspicious program 165, intercepting instructions sent by the suspicious program 165 and relaying appropriate responses from the operating system 140 (or the hardware of the computing system 120). The sandbox module 155 can follow the control flow of a sandboxed suspicious program 165 as it passes sequentially from instruction to instruction.

However, to avoid detection, malware developers can use various techniques to interrupt regular control flow (and therefore the sandbox module's monitoring of the suspicious application 165). As described above, malware can intentionally trigger an exception which requires handling by the exception handling system 145. If the malware was executing in the native environment, it could handle the exception and continue execution, but, if the sandbox module 155 cannot replicate the handling of the intentional exception in the way expected by the suspicious program 165, emulation of the suspicious program 165 can end at the point the exception is thrown. Intentional exceptions (and handling intentional exceptions in a sandbox) will be discussed further in relation to FIG. 2.

The server 105 is a computer system configured to store, receive, and transmit data to client devices 120 via the network 110. The server 105 may include a singular computing system, such as a single computer, or a network of computing systems, such as a data center or a distributed computing system. The server 105 may connect with the computing device 120 to receive and send data. For example, the server 105 may send the computing device 120 configuration data for the anti-malware application 150.

Figure 2:
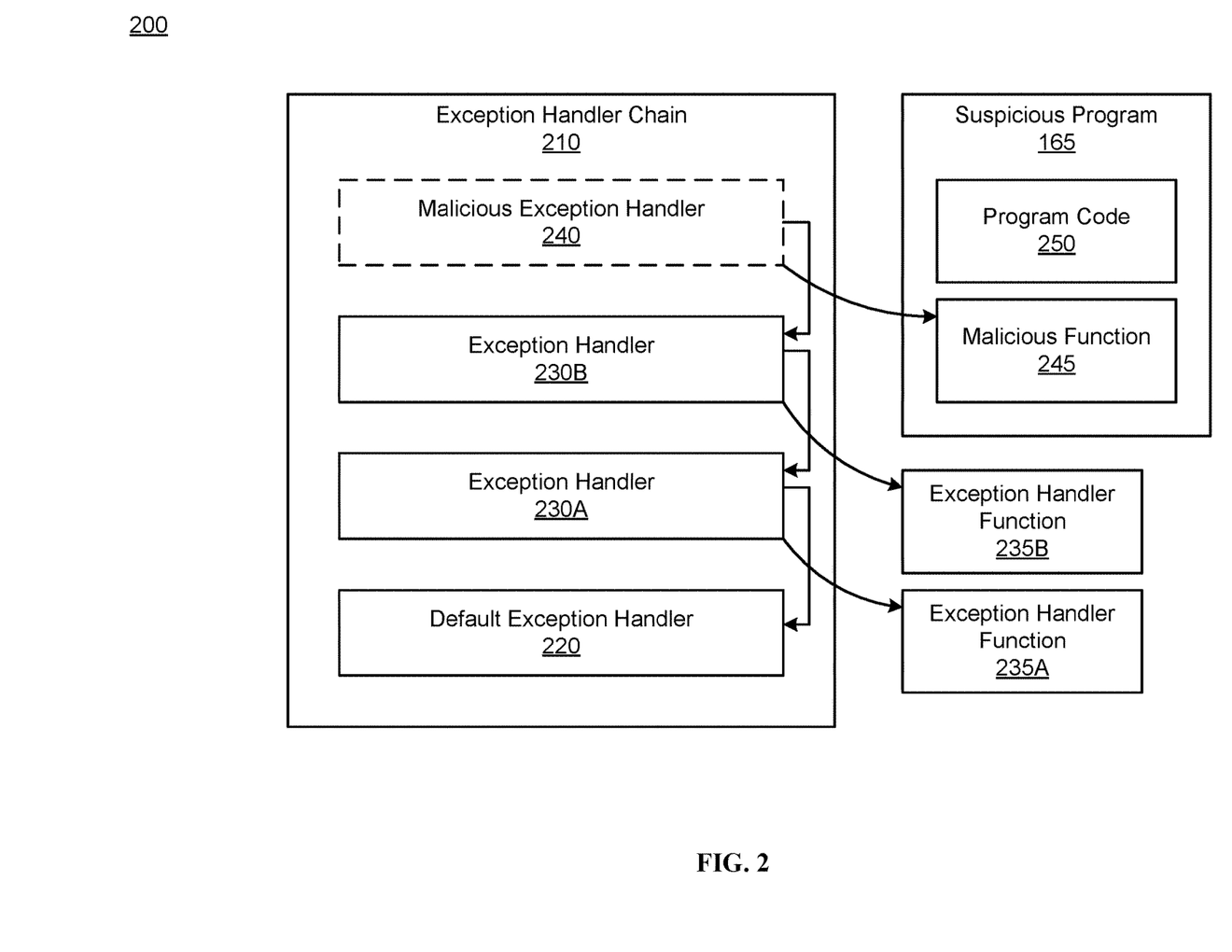
FIG. 2 is a block diagram illustrating an example exception handler chain including a malicious exception handler, according to an embodiment.

FIG. 2 is a block diagram illustrating an example exception handler chain 210 including a malicious exception handler. The environment 200 of FIG. 2 contains an exception handler chain 210, a default exception handler 220, a set of exception handlers 230A and 230B (collectively referenced as exception handlers 230) which call exception handler functions 235A and 235B respectively (collectively referenced as exception handler functions 235), and a malicious exception handler 240 which calls a malicious function 245 in a suspicious program 165 also including other program code 250.

Many operating systems 140 use an exception handler chain 210 as part of the exception handling system 145 for the operating system 140. For example, WINDOWS operating systems 140 use a "structured exception handler" (SEH) system that includes an exception handler chain 210 (the "SEH chain") and other operating systems 140 use similar constructions to organize and manage exception handlers. The exception handler chain 210 includes a set of exception handlers when can be used to resolve exceptions occurring when code is executed on the computing system 120. The exception handler chain 210 is organized as a stack, starting from the top (here, the malicious exception handler 240), including a set of additional exception handlers 230, and terminating at a default exception handler 220 (at the bottom of the stack). Each exception handler in the exception handler chain can include a reference to a corresponding function (the "destination address" of the exception handler) and a reference to the next exception handler (if any) in the exception handler chain 210. When an exception handler is added to the exception handler chain 210, it is added to the top of the stack and references the previous first exception handler. For example, when the malicious exception handler 240 is added to the exception handler chain 210 it references the exception handler 230B (the previous head of the exception handler chain 210).

As described above, each exception handler is associated with a function which can be called by the exception handling system 145 to resolve an exception that has occurred in a program. For example, exception handlers can include a destination address pointer pointing to the start of the desired function. When selecting an exception handler to resolve a given exception, the exception handling system 145 can first access the exception handler at the top of the exception handler chain 210, attempt to use the associated exception handler function to resolve the exception, and, if that doesn't work, proceed to the next exception handler in the exception handler chain 210 until one of the exception handlers satisfactorily resolves the exception (or the default exception handler 220 is reached).

The default exception handler 220 is the terminal exception handler in the exception handler chain and is slightly different from each other exception handler, as it terminates the exception handler chain 210. For example, the default exception handler 220 of a SEH chain (in a WINDOWS operating system 140) will contain a value of −1 instead of a reference to another exception handler to indicate that the default exception handler 220 represents the tail of the exception handler chain 210. In some embodiments, the default exception handler 220 is provided by the operating system 140.

The exception handlers 230 can include other exception handlers placed on the exception handler chain 210 by the operating system 140, user programs 160, by the anti-malware application 150, or the like. Each exception handler 230 is associated with a corresponding exception handler function 235. Each exception handler function 235 can attempt to revise one or more types of exceptions, for example, an exception handler 230B may point to an exception handler function 235B that causes the user program 160 triggering the exception to "gracefully exit," cleaning up relevant memory associated with the user program 160, saving open files to prevent loss of data, and the like. In some implementations, currently executing user programs 160 can add exception handlers 230 to the exception handler chain 210 than can resolve potential exceptions arising in the operation of the user program 160 and potentially allow the user program 160 to continue execution after the exception. For example, an exception handler 230 can catch exceptions arising from a user program 160 attempting to read an unfamiliar file (which may be corrupted, the wrong file, or incorrectly formatted for the user program 160), which allows the user program 160 to request a different file from a user. Commonly, exception handlers 230 are generated by a compiler for appropriate code structures (such as try/except blocks) in a user program 160. Similarly, the corresponding exception handler functions 235 can allow the continued execution of the user program 160 after a predicted exception (such as a missing file, a potential divide by zero, etc.) by providing default values and/or restoring an earlier context of the user program 160 to allow the program 160 to continue.

As described above, suspicious programs 165 containing malware can intentionally trigger exceptions to attempt to avoid detection by an anti-malware program 150. In order to continue execution after the intentional exception, the suspicious program 165 can first register a malicious exception handler 240 on the exception handler chain 210 before triggering the intentional exception. The malicious exception handler 240 can be associated with a malicious function 245 (a function that allows the continued execution of the suspicious program 165). In some embodiments, the purpose of a malicious function 245, in contrast with a regular exception handler function 235, is not only to resolve the exception and continue execution of the user program 160 from the point at which the exception occurred (if possible) but instead to interrupt normal control flow of the suspicious program 165 and execute further instructions from a new point within the suspicious program's code in a way that is difficult to detect. The suspicious program 165 can indirectly call the malicious function 245 by causing an intentionally exception that the exception handling system 145 will attempt to handle using the malicious exception handler 240. This technique can be extremely difficult to identify using a static analysis of the suspicious program 165 as the instructions required to add the new exception handler and trigger the intentional exception can be obfuscated and spread among many other lines of innocuous seeming code.

The anti-malware application 150 can detect this technique with the sandbox module 155 by tracking this non-linear nature of the control flow in a suspicious program 165 and enabling the sandbox module 155 to emulate and collect data on a suspicious program 165 as it triggers intentional exceptions.

Figure 3:
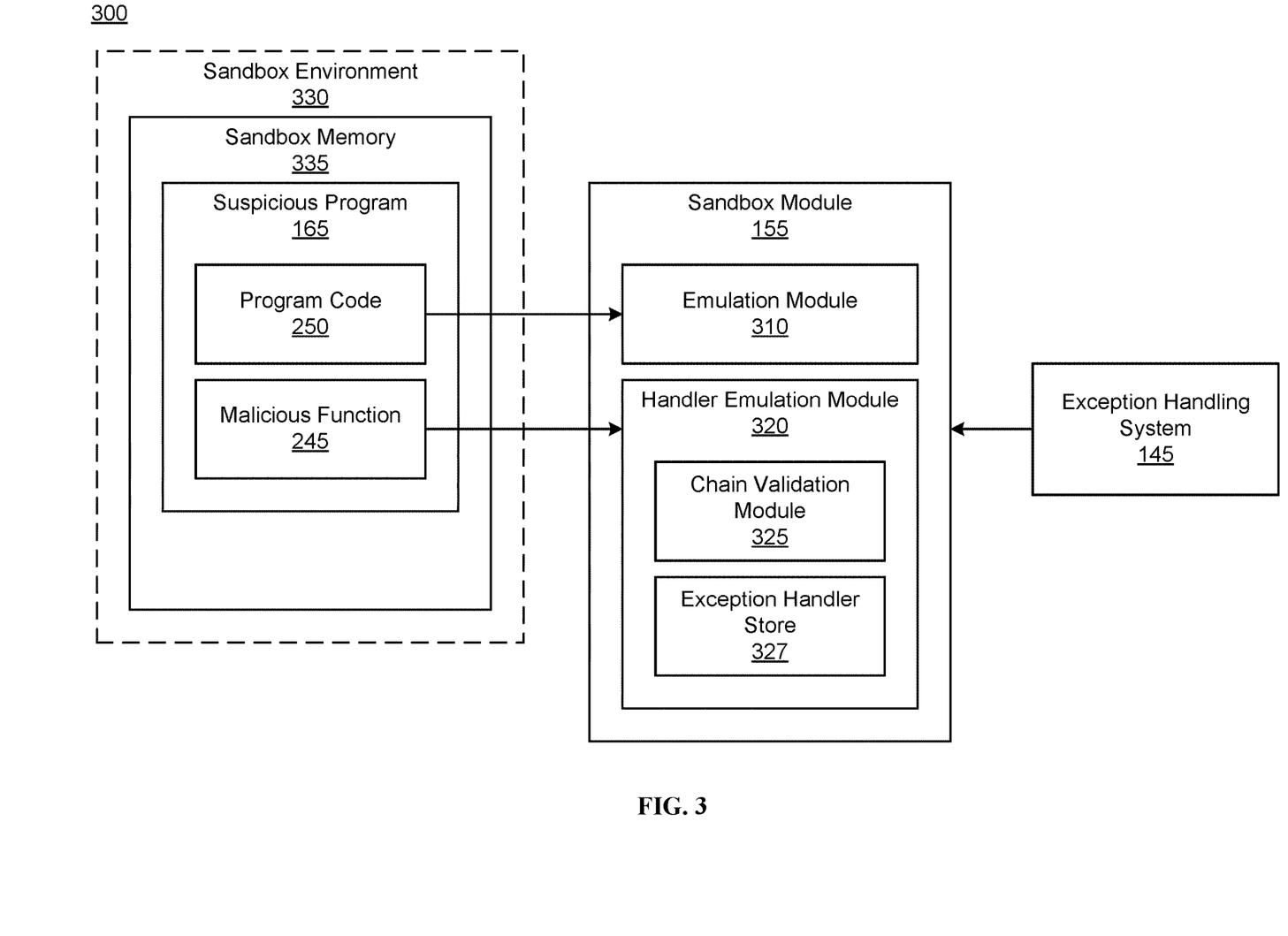
FIG. 3 is a block diagram illustrating an example sandbox module and sandbox environment for suspected malware, according to an embodiment.

FIG. 3 is a block diagram illustrating an example sandbox module and sandbox environment for suspected malware, according to an embodiment. The environment 300 of FIG. 3 contains a sandbox module 155 which manages the emulation of a suspicious program 165 within a sandbox environment 330.

To analyse a suspicious program 165 the sandbox module 155 generates a sandbox environment 330 for the suspicious program to be emulated within, according to some embodiments. The sandbox environment 330 can contain the suspicious program 165 within specific sandbox memory 335 that the suspicious program 165 will have access to. In some implementations, a suspicious program 165 running in a sandbox environment 330 does not have access to memory or storage resources outside of the sandbox memory 335. When the suspicious program 165 is being sandboxed (i.e. running in the sandbox environment 330), the sandbox module 155 tracks each instruction executed by the suspicious program 165, as well as any values saved to the sandbox memory 335 by the suspicious program 165. In some implementations, the sandbox module 155 wraps the suspicious program 165 as it is executing in the sandbox, such that to the operating system instructions originating from the suspicious program 165 appear to be coming from the sandbox module 155.

The sandbox module 155 of FIG. 3 includes an emulation module 310 to emulate the suspicious program 165 during normal control flow and a handler emulation module 320 for situations where the suspicious program 165 triggers an exception (intentionally or not). To emulate the suspicious program 165, the emulation module 310 can follow the execution of the program code 250 of the suspicious program 165 and monitor the suspicious program 165 as it executes each sequential instruction of the program code 250. In some embodiments, the emulation module 310 is able to track the suspicious program 165 during normal control flow by following the instruction pointer 165 of the suspicious program as it moves from instruction to instruction. The emulation module 310 can be configured to recognize malicious actions indicating that the suspicious program 165 contains malware. Certain malicious actions may only be detectable in a dynamic sandbox as malware developers can use obfuscation techniques to disguise malicious actions from static analysis of the suspicious program 165.

In some implementations, the emulation module 310 is configured to recognize when the suspicious program 165 is attempting to register an exception handler on the exception handler chain 210. For example, the emulation module 310 can detect the program code 250 of the suspicious program 165 attempting to change the pointer indicating the head of the exception handler chain 210. When the emulation module 310 recognizes that the suspicious program is attempting to add a new exception handler, the emulation module 310 instead register a wrapped exception handler, which directs the exception handling system 145 to the sandbox module 155 (instead of directly to the malicious function 245) if an exception is triggered. In some implementations, the sandbox module 155 acts as a proxy with the exception handling system 145 and will be triggered on all exceptions during the emulation of a suspicious program 165.

For suspicious programs 165 which trigger intentional exceptions, the program code 250 being emulated by the emulation module 310 may contain intentionally faulty code, or code intentionally set up to cause an exception when executed by the computing system 120. As described above, the normal control flow of the suspicious program 165 is interrupted when an exception is triggered, and the exception handling system 145 may take control of the instruction pointer to attempt to resolve the exception, impeding the ability of the emulation module 310 to emulate the suspicious program 165. Instead, when the sandbox module 155 detects that an exception has occurred within the sandbox environment 330 (for example, due to the exception handling system 145 calling a wrapped exception handler of the sandbox module 155) the sandbox module 155 can activate the handler emulation module 320 to follow the suspicious program's resolution of the exception. When the handler emulation module 320 is notified that an exception has occurred, the handler emulation module 320 first saves the current context of the suspicious program 165 at the time the exception was triggered (the "exception context") so that the current state can be restored later for the emulation module 310 to continue regular emulation. The context of the suspicious program 165 can include the current state of the stack, memory, and/or registers used by the suspicious program 165 in the sandbox environment 330.

The chain validation module 325 may review the exception handler chain 210 as it would exist if the suspicious program 165 was running in the native environment. In some implementations, the chain validation module 325 recreates the exception handler chain based on stored exception handlers from the exception handler store 327 and any exception handlers in the current exception handler chain 210. In other embodiment, the chain validation module 325 traverses and validates the existing exception handler chain 210 (including any exception handlers added by the suspicious program 165). To validate an exception handler chain, the chain validation module 325 can traverse the exception handler chain from start to end and confirm that the exception handler chain 210 is valid. For example, in computing systems 120 using a WINDOWS operating system, the chain validation module 325 can confirm that the last exception handler in the traversed exception handler chain (for example, the default exception handler 220) references a value of −1 instead of another exception handler.

After the chain validation module 325 validates the exemption handler chain, the handler emulation module 320 can begin emulation of individual exception handlers (such as the exception handlers added by the suspicious program 165), starting at the head of the exception handler chain. For suspicious programs 165 that cause intentional exceptions, the first exception handler is likely to be a malicious exception handler added by the suspicious program 165, however, malware developers may further obfuscate the intentional exception by adding multiple exception handlers and/or by triggering multiple intentional exceptions.

The handler emulation module 320 can begin analysing an exception handler by individually validating the exception handler. In some embodiments, the handler emulation module can verify that the exception handler's destination address references a location within the sandbox memory 335 associated with the suspicious program 165 and that the function located at the destination address is valid code (for example, by disassembling a set of bytes at the destination address to verify that they recite valid instructions). For example, if the handler emulation module 320 was preparing to emulate the malicious exception handler 240 (which has a destination address pointing to the malicious function 245), the handler exception module 320 would confirm that the destination address points somewhere within the sandbox memory 335 and that the malicious function 245 was a valid, executable, function.

If the exception handler appears valid, the handler emulation module 320 can then move on to emulating the associated exception handler function. To emulate an exception handle function, the handler emulation module 320 restores the saved exception context and begins emulating the exception handler function. In some implementations, the handler emulation module 320 can emulate the exception handler function using a similar technique to that used by the emulation module 310 to emulate the suspicious program 165 as a whole. For example, the handler emulation module can set the instruction pointer to the destination address of the exception handler function and begin emulation of instructions from there. During the emulation of the exception handler function, the handler emulation module 320 can monitor for malicious actions and/or evaluate the exception handler meets one or more success criteria. In some embodiments, the success criteria include the continued execution of the suspicious program 165 after the exception handler completes. If an exception was intentionally triggered by the suspicious program 165, that exception will likely be resolved by the continued execution of the suspicious program 165 (as opposed to, for example, the graceful exit of the suspicious program 165), therefore the handler emulation module 320 may evaluate emulated exception handlers based on if the exception handler results in the continued execution of the suspicious program 165.

If the handler emulation module 320 detects that an emulated exception handler meets the success criteria (for example, if the suspicious program 165 can continue executing), the handler emulation module 320 saves an updated context of the suspicious program 165 (the "post-exception context") including any changes made by the exception handler function to resolve the exception (or, in the case of an intentional exception, changes made by arbitrary code within the exception handler function, potentially including malicious actions). The handler emulation module 320 can then forward the post-exception context to the emulation module 310 which can restart the emulation of the suspicious program 165 using the post-exception context. From the perspective of the suspicious program 165, restarting emulation using the post-exception context places the suspicious program 165 in the same state as if the exception had occurred and been handled using the exception handling system 145 in the native environment. In some implementations, separate emulation of exception handlers allows the sandbox module 155 to successfully emulate the suspicious program 165 as it would execute in the native environment as the suspicious program 165 triggers intentional exceptions to disrupt control flow.

In some embodiments, if the emulated exception handler completes execution and does not meet the success criteria (for example, if the suspicious program 165 is not able to continue execution), the handler emulation module 320 can save an updated context (post execution of the emulated exception handler), move to the next exception handler in the exception handler chain, load the updated context and emulate the next exception handler. The handler emulation module 320 can repeat this process until one of the exception handlers meets the success criteria or all exception handlers (or all exception handlers added by the suspicious program 165) in the exception handler chain 210 have been emulated unsuccessfully.

Malware developers may try to nest intentional exceptions within a malicious exception handler function 245. If a new exception is triggered during the emulation of an exception handler, the handler emulation module can save a new context for the nested exception, resolve the nested exception as described above, and continue the emulation of the original exception handler.

Figure 4:
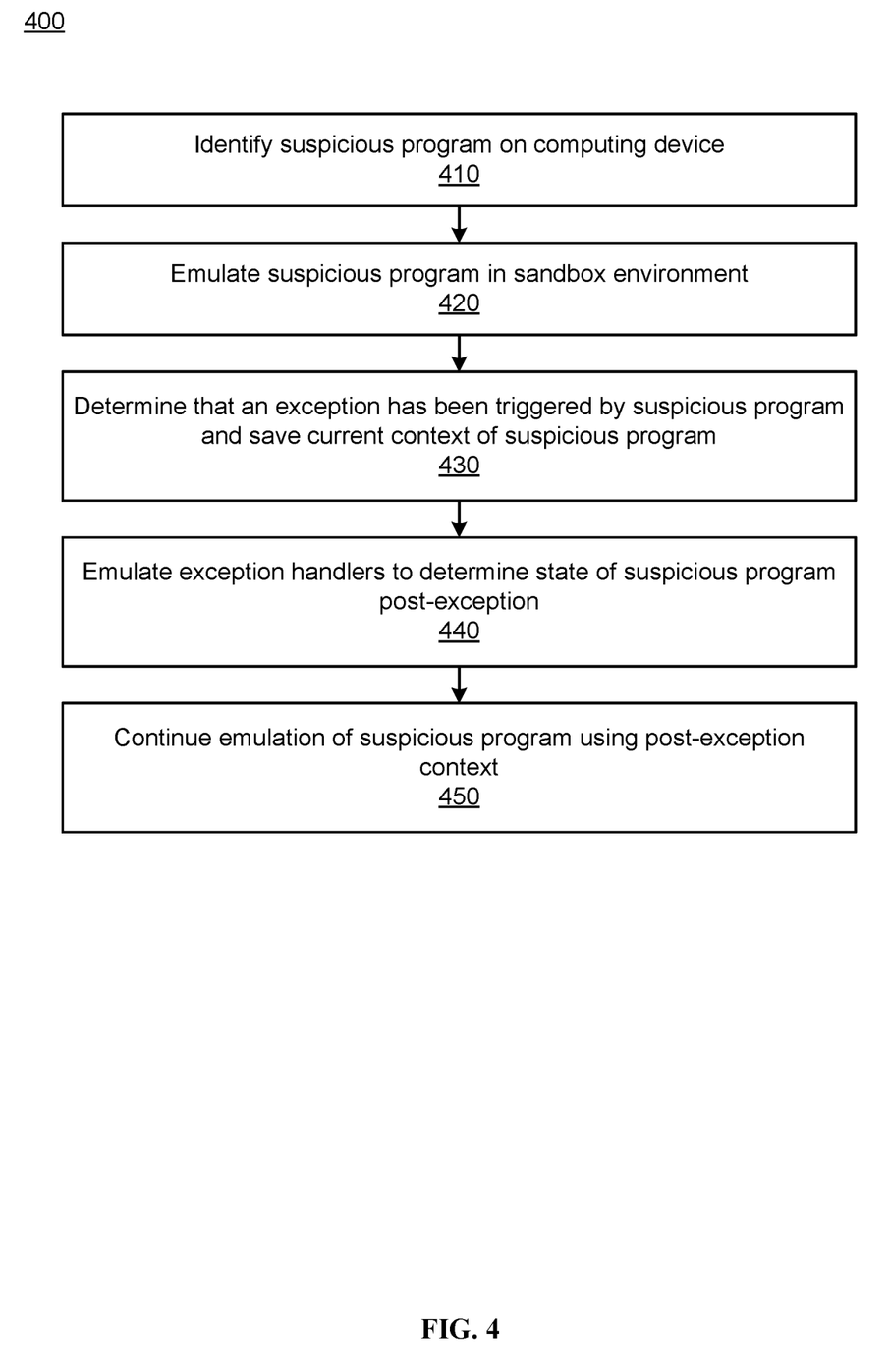
FIG. 4 is a flowchart illustrating an example process for handling triggered exceptions while emulating a program in a sandbox.

FIG. 4 is a flowchart illustrating an example process for handling triggered exceptions while emulating a program in a sandbox. The process 400 begins when an anti-malware application identifies a suspicious program on a computing device. The anti-malware application can then proceed to emulate 420 the suspicious program in a sandbox environment. As described above, the anti-malware application can follow the flow of the suspicious program 165. If the emulation is interrupted by an exception (such as if an exception handler system notifies the anti-malware application), the anti-malware application can determine 430 that the exception was triggered by the suspicious program during the emulation and save a current context of the suspicious program at the time the exception was triggered. Then the anti-malware application can emulate 440 one or more exception handlers from the exception handler chain to determine the state of the suspicious program (the post-exception context) after the exception is resolved. Then, the anti-malware application continues emulation 450 of the suspicious program using the post-exception context.

Figure 5:
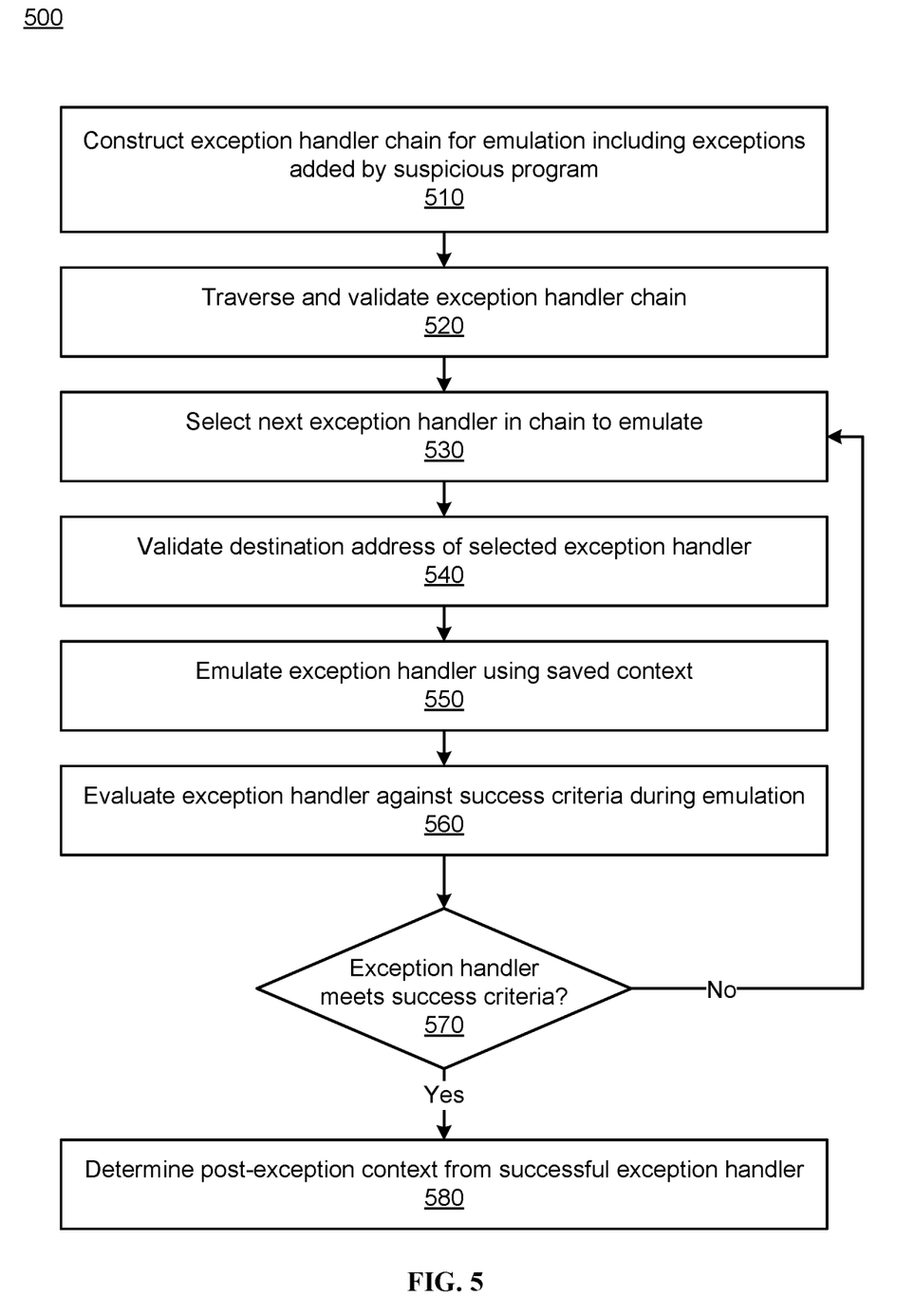
FIG. 5 is a flowchart illustrating an example process for emulating an exception handler in response to a triggered exception in a sandbox.

FIG. 5 is a flowchart illustrating an example process for emulating an exception handler in response to a triggered exception in a sandbox. The process 500 begins when an anti-malware application constructs 510 an exception handler chain for emulation (for example, in response to an exception triggered during emulation) which includes exception handlers associated with the suspicious program. Then, the anti-malware application can traverse and validate

520 the exception handler chain. After the exception handler chain is validated, the anti-malware application selects 530 the next exception handler in the chain (starting with the exception handler at the head of the chain) to emulate. Then, the anti-malware application can validate 540 that the destination address and associated exception handler function of the selected exception hander are valid. For example, the anti-malware can check that the destination address points to an expected location in memory and that that location contains valid code. Then a saved context of the state of the suspicious program at the time of the exception is reloaded and the selected exception handler is emulated 550 (for example, by emulating the code located at the destination address of the selected). As the exception handler is emulated, the anti-malware application can evaluate 560 the exception handler against a set of success criteria (for example, if the suspicious program is able to continue execution after the exception handler). If the exception handler meets the success criteria 570, the anti-malware application determines 580 an updated post-exception context based on the emulation of the successful exception handler. Alternately, if the exception handler does not meet 570 the success criteria, the anti-malware application can return to step 530 and evaluate the next exception handler in the exception handler chain.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method comprising:
    identifying, at a computing device, a suspicious program;
    emulating, by an anti-malware application, the suspicious program in a sandbox environment;
    responsive to the suspicious program attempting to add an exception handler to an exception handler chain of the computing device, registering, by the anti-malware application, a wrapped exception handler to the exception handler chain;
    emulating, by the anti-malware application, one or more instructions of the suspicious program which trigger an exception;
    detecting, by the anti-malware application using the wrapped exception handler, the exception triggered by the emulated suspicious program;
    responsive to detecting the exception using the wrapped exception handler, emulating a first exception handler associated with the suspicious program; and
    responsive to the first exception handler meeting a set of success criteria, continuing emulation of the suspicious program based on a result of the first exception handler.

2. The method of claim 1, wherein the exception handler chain comprises one or more exception handlers for resolving the exception, and emulating the first exception handler comprises:
    saving a current context of the suspicious program;
    validating the exception handler chain;
    selecting the first exception handler from the one or more exception handlers of the exception handler chain;
    emulating, by the anti-malware application, the first exception handler based on the saved context of the suspicious program; and
    evaluating the first exception handler against the set of success criteria.

3. The method of claim 2, wherein validating the exception handler chain comprises:
    traversing the exception handler chain, the exception handler chain comprising one or more default exception handlers associated with an operating system and one or more logged exception handlers added by the suspicious program.

4. The method of claim 1, wherein emulating the first exception handler comprises:
    saving an updated context of the suspicious program based on the execution of the first exception handler.

5. The method of claim 1, wherein the set of success criteria comprises a determination that the suspicious program is able to continue execution after the execution of the first exception handler.

6. The method of claim 1, wherein emulating the first exception handler comprises:
validating that a destination address of the first exception handler points to a location in memory corresponding to the suspicious program.

7. The method of claim 1, further comprising:
responsive to the first exception handler not meeting the success criteria, emulating a second exception handler of the exception handler chain.

8. A non-transitory computer readable storage medium comprising instructions which, when executed by a processor, cause the processor to perform the steps of:
identifying, at a computing device, a suspicious program;
emulating, by an anti-malware application, the suspicious program in a sandbox environment;
responsive to the suspicious program attempting to add an exception handler to an exception handler chain of the computing device, registering, by the anti-malware application, a wrapped exception handler to the exception handler chain;
emulating, by the anti-malware application, one or more instructions of the suspicious program which trigger an exception;
detecting, by the anti-malware application using the wrapped exception handler, the exception triggered by the emulated suspicious program;
responsive to detecting the exception using the wrapped exception handler, emulating a first exception handler associated with the suspicious program; and
responsive to the first exception handler meeting a set of success criteria, continuing emulation of the suspicious program based on a result of the first exception handler.

9. The computer readable storage medium of claim 8, wherein the exception handler chain comprises one or more exception handlers for resolving the exception, and emulating the first exception handler comprises:
saving a current context of the suspicious program;
validating the exception handler chain comprising one or more exception handlers for resolving the exception;
selecting the first exception handler from the one or more exception handlers of the exception handler chain;
emulating, by the anti-malware application, the first exception handler based on the saved context of the suspicious program; and
evaluating the first exception handler against the set of success criteria.

10. The computer readable storage medium of claim 9, wherein validating the exception handler chain comprising one or more exception handlers for resolving the exception comprises:
traversing the exception handler chain, the exception handler chain comprising one or more default exception handlers associated with an operating system and one or more logged exception handlers added by the suspicious program.

11. The computer readable storage medium of claim 8, wherein emulating the first exception handler comprises:
saving an updated context of the suspicious program based on the execution of the exception handler.

12. The computer readable storage medium of claim 8, wherein the set of success criteria comprises a determination that the suspicious program is able to continue execution after the execution of the first exception handler.

13. The computer readable storage medium of claim 8, wherein emulating the first exception handler based on the saved context of the suspicious program comprises:
validating that a destination address of the first exception handler points to a location in memory corresponding to the suspicious program.

14. The computer readable storage medium of claim 8, wherein the instructions further cause the processor to perform the step of:
responsive to the first exception handler not meeting the success criteria, emulating a second exception handler of the exception handler chain.

15. A computer system comprising:
one or more processors; and
a non-transitory computer readable storage medium comprising instructions which, when executed by the processor, cause the processor to perform the steps of:
identifying, at a computing device, a suspicious program;
emulating, by an anti-malware application, the suspicious program in a sandbox environment;
responsive to the suspicious program attempting to add an exception handler to an exception handler chain of the computing device, registering, by the anti-malware application, a wrapped exception handler to the exception handler chain;
emulating, by the anti-malware application, one or more instructions of the suspicious program which trigger an exception;
detecting, by the anti-malware application using the wrapped exception handler, the exception triggered by the emulated suspicious program;
responsive to detecting the exception using the wrapped exception handler, emulating a first exception handler associated with the suspicious program; and
responsive to the first exception handler meeting a set of success criteria, continuing emulation of the suspicious program based on a result of the first exception handler.

16. The system of claim 15, wherein the exception handler chain comprises one or more exception handlers for resolving the exception, and emulating the first exception handler comprises:
saving a current context of the suspicious program;
validating the exception handler chain comprising one or more exception handlers for resolving the exception;
selecting the first exception handler from the one or more exception handlers of the exception handler chain;
emulating, by the anti-malware application, the first exception handler based on the saved context of the suspicious program; and
evaluating the first exception handler against the set of success criteria.

17. The system of claim 15, wherein emulating the first exception handler based on the saved context of the suspicious program comprises:
validating that a destination address of the first exception handler points to a location in memory corresponding to the suspicious program.

* * * * *